United States Patent [19]
Spiegel

[11] 3,801,894
[45] Apr. 2, 1974

[54] POWER SUPPLY WITH NONLINEAR FOLDBACK CURRENT LIMITER CIRCUIT

[75] Inventor: Robert M. Spiegel, Pelham, N.Y.

[73] Assignee: Trygon Electronics, Inc., Westbury, N.Y.

[22] Filed: Sept. 15, 1972

[21] Appl. No.: 289,261

[52] U.S. Cl................... 323/9, 317/3, 317/33 VR, 323/17, 323/20, 323/22 T
[51] Int. Cl................................................. G05f 1/56
[58] Field of Search............. 323/4, 9, 17, 20, 22 T; 317/31, 33 VR

[56] References Cited
UNITED STATES PATENTS

| | | | |
|---|---|---|---|
| 3,072,841 | 1/1963 | Saunders | 323/22 T |
| 3,072,842 | 1/1963 | Vaughn | 323/22 T |
| 3,005,147 | 10/1961 | Thomas | 323/9 |
| 3,345,554 | 10/1967 | Lupoli | 323/4 |
| 3,473,106 | 10/1969 | Grabl | 323/9 |
| 3,675,114 | 7/1972 | Nercessian | 323/9 |

*Primary Examiner*—Gerald Goldberg

[57] ABSTRACT

A power supply has transistors arranged to pass current from a power source to a load having a variable resistance so that current drawn by the load is variable. The circuit includes a comparator amplifier which compares a reference voltage with output voltage and actuates a bias control transistor for reducing conductance of the transistors when an overload occurs. A nonlinear current foldback means is connected in circuit with the bias control transistor to introduce a non-linear characteristic in the control of bias of the transistors.

4 Claims, 2 Drawing Figures

PATENTED APR 2 1974    3,801,894
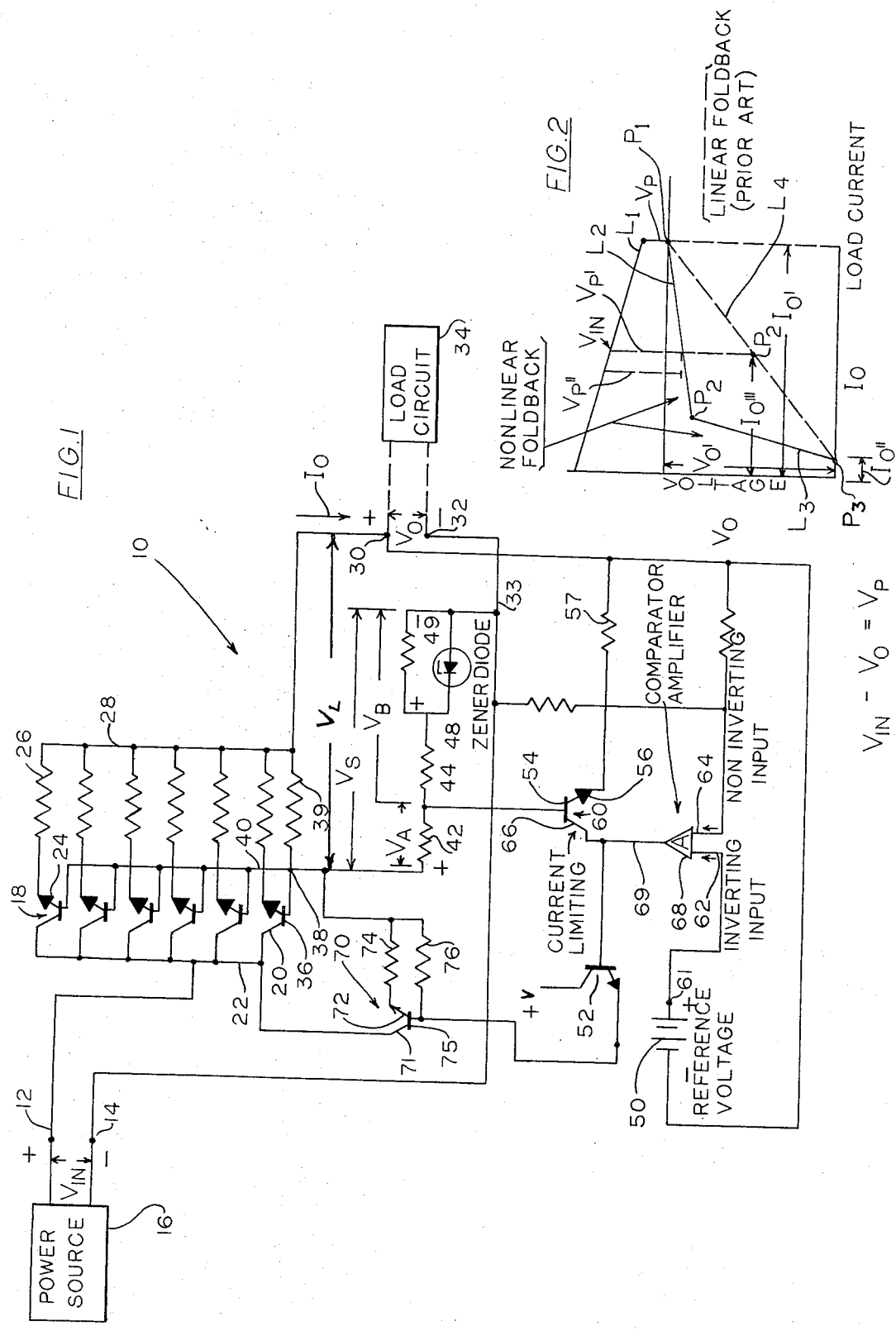

POWER SUPPLY WITH NONLINEAR FOLDBACK CURRENT LIMITER CIRCUIT

This invention relates to the art of transistorized current limiter circuits and more particularly concerns a limiter circuit having means for producing nonlinear foldback of the controlled and limited current.

It is well known in the art to provide a transistorized current limiter circuit connected between a power supply and a resistance load to limit the load current in the event that the load exceeds a preset value. Such limitation is necessary to protect components of both the load circuit and the current limiter circuit against excessive heating and damage due to excessive load current. It is also known to provide a current limiter circuit with means for linear foldback of the load current so that the current passed by the limiter and the voltage applied to the load both drop in a linear relationship. It has been found that such conventional limiter circuits with linear foldback means do not sufficiently protect delicate, heat sensitive, semiconductor components of the limiter circuit because overvoltages are applied to the limiter circuit even though the load current, under foldback conditions, is being reduced from normal magnitudes to minimum ones.

It is therefore a principal purpose of the invention to overcome the above and other difficulties and disadvantages of prior transistorized limiter circuits, by providing a limiter circuit with nonlinear foldback control. More precisely stated, the foldback is controlled at two rates. First the load current is decreased rapidly while the voltage applied to the limiter circuit is being reduced less rapidly until a critical voltage current point is reached, whereupon the applied voltage is reduced more rapidly while the load current is reduced less rapidly until minimum residual voltage and current magnitudes are reached. These desirable results are obtained by providing the limiter circuit with a comparator amplifier responsive to the magnitude of load current to drive pass transistors in the limiter circuit and by providing nonlinear resistance means responsive to a sampling of load current to activate a current limiting transistor which reduces the driving current of the pass transistors in the event of current overload. The net effect is to cause foldback of load current at two different successive linear rates, so that the limiter circuit is protected under all current conditions against overheating and consequent damage.

Accordingly, a primary object of the present invention is to provide a transistorized limiter circuit with nonlinear foldback control.

Another object of the present invention is to provide a limiter circuit with the foldback controlled at at least two different rates.

These and other objects and many of the attendant advantages of this invention will be readily appreciated as the same becomes beter understood by reference to the following detailed description when considered in connection with the accompanying drawings in which:

FIG. 1 is a diagram of a limiter circuit embodying the invention; and

FIG. 2 is a graphic diagram used in explaining the invention.

A power supply shown has a pair of input terminals 12, 14 to which a direct input voltage Vin is applied from a suitable power source 16. This can be a power supply converting AC to DC or any other suitable power source. The terminal 12 is a positive voltage terminal and the terminal 14 is a negative voltage terminal. The voltage is reduced in magnitude or stepped down by a plurality of current pass transistors 18 connected in parallel. Each of the collectors 20 of the transistors 18 is connected to a common line 22 to which the positive terminal 12 is connected. Each of the emitters 24 of the transistors 18 is connected in series with an individual resistor 26 which is connected to a common line 28 connected to the positive voltage output line terminating at a circuit output terminal 30. A negative voltage output terminal 32 is connected via a negative load line 33 to the input terminal 14. Any suitable resistance load or load circuit 34 which draws a load current I at an output voltage $V_o$ can be connected across the output terminals 30, 32. It will be understood that the load circuit 34 is subject to variable internal resistance conditions and it is therefore necessary to provide means for safely limiting the current drawn by the load circuit to avoid damaging the current passing transistors 18 as well as the load circuit 34 itself. The means for doing this will now be described.

Each of the bases 36 of the transistors 18 is connected to a junction point 38 on a line 40. Connected in series to junction points 38 is a resistor 42 and a resistor 44. Connected to the resistor 44 is a zener diode 48 which in turn is connected to the negative load line 33. A resistor 49 is connected across the zener diode 48. The sum of the voltage $V_A$ across the resistor 42 and the voltage $V_b$ across the resistors 44 and the zener diode 48, equals a voltage $V_s$ which is opposed by a voltage $V_o$ which is the output voltage developed across the load circuit 34 at the terminals 30 and 32. The current passing through the resistor 26 is proportional to the load current $I_o$, and thus constitutes in effect a sampling of the load current at all times.

A voltage source 50 provides a constant reference voltage which is applied to one input 62 of a conventional comparator amplifier 68. Another input 64 of the amplifier 68 is connected to the terminals 30 and 32 to sample the output voltage $V_o$. An output 69 of the comparator amplifier 68 is connected in circuit to a pair of transistors 52 and 70 which amplifies the output 69 and controls the bias applied to the pass transistors 18 and thus controls their conductance. A collector 71 from transistor 70 is connected to the line 22. An emitter 72 from the transistor 70 is connected to the line 40 via a resistor 74. A base 75 is connected via a resistor 76 to the line 40. By this arrangement, the current pass transistors 18 are enabled to conduct at full rated current when the comparator amplifier 68 drives the transistor 52 and 70 to provide proper enabling bias to the transistors 18.

The operation of circuit 10 will be now explained with particular reference to both FIGS. 1 and 2. Referring first to FIG. 2, the load current $I_o$ is plotted against output load voltage $V_o$. A sloping line L1 represents normal decrease in voltage applied to the circuit 10 under conditions of increasing load current. At a critical maximum load current $I_{o'}$, the output voltage will be $V_{o'}$. The voltage across the pass transistors 18 and the resistor 26 will be $V_{p'}$ i.e. $V_p+V_o=V_{in}$. Suppose now an overload occurs in the output load circuit 34. The circuit 10 will respond by a foldback in the load current $I_o$ which will drop rapidly as indicated by the slope of line L2 from point P1 while the voltage $V_{o'}$ applied to the load will drop more slowly, and the voltage $V_p$ applied to the pass transistors 18 will rise slowly. The voltage $V_p$ will be measured on the graph by the distance between the line L2 and the input voltage line L1. At point P2, a critical voltage is reached where the current passing through the pass transistors 18 is reduced to a safe level. The load voltage will then drop more rapidly as indicated by the steep slope of the foldback line L3, whereas the load current drops more slowly until point P3 is reached where a minimum residual load current $I_{o''}$ is maintained. This residual current condition is maintained to keep transistors 18 activated and awaiting restoration of full load conditions upon normalization of the load. It will be noted that the current foldback is nonlinear, that is, it is done in two linear stages at different rates.

This mode of operation of the invention may now be contrasted with that illustrated by the dotted line L4 which represents linear foldback of load current as obtained with a conventional current limiter provided with linear foldback means. It will be noted that the load current and load voltage drop uniformly in linear relationship with each other to point P3 where residual voltage and current are obtained. However at some intermediate load current $I_{o''}$, the voltage $V_{p'}$, applied to the pass transistors is excessive ie the power dissapation $I_{o'} \times V_{p''}$ is likely to burn them out or considerably shorten the useful life thereof. By contrast, at this load current $I_{o''}$, the voltage $V_{p''}$ across the pass transistors 18 is only one half or less of the voltage $V_{p'}$. Thus the pass transistors 18 are effectively protected during this intermediate range of load currents between full load current $I_{o'}$ and the minimum load current $I_{o'}$.

The manner in which the components of the circuit 10 operate to produce this desirable two-stage or nonlinear foldback of load current will now be described. A current limiting transistor 60 is normally nonconducting. When it is rendered conducting it denies turn on bias to the pass transistor 18 so that the transistor 60 serves as a protective circuit device.

Power supplies such as the source 16 are required to operate at specific output levels and are improved by provision of current foldback features when load current exceeds a predetermined limit. If the load becomes such that full load current will tend to be exceeded, the load current is limited, and if the load increases, the load current will be reduced i.e. folded back. As the voltage applied to the load circuit is reduced, the load current will also be reduced. The pass transistors 18 experience heat dissipation equal to the voltage across them multiplied by the current flowing through them. When the load overvoltage becomes so large as to institute current limiting so as to reduce the output voltage, the voltage across the pass transistors 18 may become greater than in normal service. Foldback then becomes necessary. That is, by reducing current flow the degree to which the transistors can dissipate power is limited.

The voltage across the pass transistors 18 is the difference between the source input voltage $V_{in}$ and the voltage across the load $V_o$. If the voltage across the load drops from point P1 in FIG. 2, a corresponding increase in voltage across and current through the pass transistors must be avoided to prevent excessive power dissipation in and overheating of the pass transistors 18. The nonlinear diode 48 and resistor 49 are introduced into the foldback determining circuit to effect nonlinear foldback. When overload first occurs current is rapidly folded back to point $p_2$ where current is substantially less than normal service. Then the current foldback goes linearly downward at a slower rate to point $P_3$.

A load responsive voltage signal $V_L$ is developed across the resistors 26 and the base emitter junctions of the transistors 18. An emitter 56 of the transistor 60 is connected to the positive voltage output terminal 30 via a resistor 57. The voltage $V_L$ is normally not sufficient to turn on the transistor 60, however when the voltage $V_L$ exceeds the voltage $V_A$ (developed through the resistor 42), by the base emitter voltage of the transistor 60, the transistor 60 will turn on. Thus, the turn-on of the transistor 60 is controlled by the pre-set resistance of the resistor 42. If an overload condition occurs in the load circuit 34, the voltage $V_L$ increases to a point (as described above) where the transistor 60 is rendered conductive. When the transistor 60 is conductive, the collector 66 of the transistor 60 approaches the potential of the terminal 30 thereby denying the bias voltage from the pass transistors 18.

The nonlinear zener diode 48 has a low resistance when the voltage across it is high, so that this diode is normally in avalanching condition under full load conditions. The resistance of the diode 48 become high when the applied voltage is lower and avalanching ceases. Thus when the output voltage $V_o$ is high, the slope of line L2 is dominated by the low resistance of the diode 48, and when the voltage $V_o$ falls below some critical value at point P2 when avalanching no longer takes place, the diode resistance becomes high and exceeds the low resistance of resistor 49 which then becomes more effective. The load voltage then falls rapidly as indicated by the steep slope of line L3. The load current falls also but at a lower rate than during the first stage of foldback indicated by line L1.

It will now be clear why and how the circuit operates to effect foldback in two stages. The entire foldback process is linear in the sense that it is done in two stages as a result of control effected by operation of the zener diode which is a nonlinear resistance element. The pass transistors conduct at all times but under such bias control that they cannot pass excessive damaging current regardless of the external load circuit voltage, current and resistance.

It should be understood that the foregoing relates to only a preferred embodiment of the invention and that it is intended to cover all changes and modifications of the example of the invention herein chosen for the purposes of the disclosure, which do not constitute departures from the spirit and scope of the invention.

In the claims:
1. A current limiter circuit comprising:
   input terminals for receiving current from a power source;
   output terminals for passing current to a load;
   current transmissions components in circuit with said input and output terminals for passing said current to said load;
   a current limiting means connected in circuit with said current transmission components for limiting current passing through said components to predetermined safe magnitudes; and
   nonlinear current foldback means connected in circuit with said current transmission components, said nonlinear foldback means comprising a Zener diode whose resistance is low due to avalanching when the applied voltage is high and whose resistance is high due to cessation of avalanching when the applied voltage is low, so that said nonlinear current foldback means initially reduces the current through said current transmission components rapidly while reducing the voltage applied thereto slowly, and when current passing through said current transmission components has been reduced to a safe mangitude, the voltage applied thereto is reduced rapidly while the current passing thereto is reduced slowly.

2. A current limiter circuit as defined in claim 1, wherein said current transmission components are pass transistors, and said circuit further comprises a bias control means arranged in circuit with said transistors for varying the current conductance thereof, said bias control means being further connected in circuit with said current limiting means, so that the conductance of said transistors is controlled by said current limiting means when said load exceeds a preset value.

3. A current limiter circuit as defined in claim 2, wherein said bias control means comprises:
  a comparator amplifier having two inputs and an output;
  a first circuit means connecting one amplifier input to said output terminals;
  a reference voltage source connected in circuit with the other input to said amplifier; and
  circuit means connecting said output of said amplifier to said transistors and to said current limiting means, whereby said comparator amplifier produces a bias voltage to control the conductance of said transistors and said current limiting means denies the passage of said bias voltage to said transistors when said load exceeds a preset value.

4. A current limiter circuit as defined in claim 1, wherein said current limiting means comprises a normally non-conducting current limiting other transistor connected in circuit with said bias control means, whereby said current limiting transistor is rendered conductive when said load exceeds a preset value.

* * * * *